US009344455B2

(12) United States Patent
Himawan et al.

(10) Patent No.: US 9,344,455 B2
(45) Date of Patent: May 17, 2016

(54) APPARATUS AND METHOD FOR SHARING A HARDWARE SECURITY MODULE INTERFACE IN A COLLABORATIVE NETWORK

(71) Applicant: MOTOROLA SOLUTIONS, INC, Schaumburg, IL (US)

(72) Inventors: Erwin Himawan, Chicago, IL (US); Anthony R Metke, Naperville, IL (US); George Popovich, Palatine, IL (US); Shanthi E Thomas, Hoffman Estates, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/447,257

(22) Filed: Jul. 30, 2014

(65) Prior Publication Data

US 2016/0036854 A1  Feb. 4, 2016

(51) Int. Cl.
*H04L 29/06* (2006.01)
*H04L 9/00* (2006.01)
(Continued)

(52) U.S. Cl.
CPC .............. *H04L 63/20* (2013.01); *H04L 9/3234* (2013.01); *H04L 12/4633* (2013.01);
(Continued)

(58) Field of Classification Search
CPC ......... H04L 63/10; H04L 63/20; H04L 63/08; H04L 63/06; H04L 63/0428; H04L 29/06; H04L 67/16; H04L 61/1541; H04L 9/3234; H04L 12/4633; H04L 2209/76; H04W 12/08; H04W 12/04; G06Q 20/3226; G06Q 20/3227; G06F 21/57; G06F 2221/2153; G06F 21/602; G06F 21/606; G06F 21/62; G06F 21/6245; G06F 2209/509; Y10S 707/99939
See application file for complete search history.

(56) References Cited

U.S. PATENT DOCUMENTS 6,076,168 A * 6/2000 Fiveash ............... H04L 63/0263 713/154
6,092,191 A * 7/2000 Shimbo ............... H04L 63/0428 380/258

(Continued)

FOREIGN PATENT DOCUMENTS

WO   2009153710 A2   12/2009

OTHER PUBLICATIONS

Lorch, Markus, Jim Basney, and Dennis Kafura. "A hardware-secured credential repository for Grid PKIs." Cluster Computing and the Grid, 2004. CCGrid 2004. IEEE International Symposium on. IEEE, 2004.*

(Continued)

*Primary Examiner* — Michael Simitoski

(57) ABSTRACT

A first communication device having a secure access to a security module establishes a collaborative network by forming a collaborative security association with a second communication device associated with a user of the first communication device. The first communication device (a) sends an advertisement of services associated with the security module to the second communication device and receives an advertisement response from the second communication device or (b) receives a solicitation request for services associated with the security module from the second communication device. Responsive to receiving one of the advertisement response and the solicitation request, the first communication device determines whether the second communication device is authorized to access the security module. The first communication device processes and forwards security service messages between the second communication device and the security module, in response to determining that the second communication device is authorized to access the security module.

23 Claims, 3 Drawing Sheets

(51) Int. Cl.
*H04W 12/08* (2009.01)
*H04W 12/04* (2009.01)
*H04L 9/32* (2006.01)
*H04L 12/46* (2006.01)
*G06F 21/62* (2013.01)

(52) U.S. Cl.
CPC ........... *H04L 63/0428* (2013.01); *H04L 63/06* (2013.01); *H04L 63/08* (2013.01); *H04L 63/10* (2013.01); *H04W 12/04* (2013.01); *H04W 12/08* (2013.01)

(56) References Cited

U.S. PATENT DOCUMENTS

| | | | | |
|---|---|---|---|---|
| 6,792,466 | B1* | 9/2004 | Saulpaugh | G06F 9/465 707/999.01 |
| 8,984,592 | B1* | 3/2015 | Paczkowski | H04W 12/08 726/26 |
| 9,027,102 | B2* | 5/2015 | Katzer | G06F 21/6245 709/229 |
| 2002/0143855 | A1* | 10/2002 | Traversat | G06F 9/4416 709/202 |
| 2002/0143944 | A1* | 10/2002 | Traversat | G06F 9/4416 709/225 |
| 2004/0030794 | A1* | 2/2004 | Hugly | H04L 63/02 709/230 |
| 2004/0081154 | A1* | 4/2004 | Kouvelas | H04L 12/4633 370/392 |
| 2004/0098447 | A1* | 5/2004 | Verbeke | G06F 9/5055 709/201 |
| 2004/0250126 | A1* | 12/2004 | Buer | G06F 21/57 726/12 |
| 2005/0027871 | A1* | 2/2005 | Bradley | G06F 21/10 709/227 |
| 2005/0091494 | A1* | 4/2005 | Hyser | G06F 21/57 713/171 |
| 2005/0223109 | A1* | 10/2005 | Mamou | G06Q 10/10 709/232 |
| 2006/0041937 | A1* | 2/2006 | Chandley | H04L 63/0218 726/12 |
| 2007/0283153 | A1* | 12/2007 | Metke | H04L 63/0869 713/169 |
| 2007/0300069 | A1* | 12/2007 | Rozas | G06F 21/57 713/176 |
| 2008/0072070 | A1* | 3/2008 | LaMacchia | G06F 21/51 713/193 |
| 2009/0292919 | A1* | 11/2009 | England | H04L 9/0897 713/168 |
| 2012/0079368 | A1* | 3/2012 | Abdelaziz | G06F 9/465 715/234 |
| 2012/0124658 | A1* | 5/2012 | Brudnicki | G06F 21/34 726/9 |
| 2012/0238206 | A1* | 9/2012 | Singh | H04L 63/0492 455/41.1 |
| 2012/0317628 | A1* | 12/2012 | Yeager | G06Q 20/204 726/5 |
| 2013/0067243 | A1* | 3/2013 | Tamayo-Rios | G06F 21/44 713/193 |
| 2013/0145429 | A1 | 6/2013 | Mendel et al. | |
| 2013/0219164 | A1* | 8/2013 | Hamid | H04L 60/0485 713/150 |
| 2014/0074637 | A1* | 3/2014 | Hammad | G06Q 20/12 705/21 |
| 2014/0208434 | A1* | 7/2014 | Brouwer | G06F 21/62 726/26 |
| 2014/0227972 | A1* | 8/2014 | Swaminathan | H04B 5/0031 455/41.1 |
| 2014/0230007 | A1* | 8/2014 | Roth | G06F 21/602 726/1 |
| 2014/0282936 | A1* | 9/2014 | Fitzgerald | H04L 63/10 726/6 |
| 2014/0298411 | A1* | 10/2014 | Castell | H04W 12/08 726/2 |
| 2014/0317686 | A1* | 10/2014 | Vetillard | G06F 21/74 726/2 |
| 2015/0033290 | A1* | 1/2015 | Benyo | H04L 67/34 726/3 |

OTHER PUBLICATIONS

Urien, Pascal. "Cloud of Secure Elements perspectives for mobile and cloud applications security." Communications and Network Security (CNS), 2013 IEEE Conference on. IEEE, 2013.*
Assed, Jehangir et al.: "Securing Personal Network clusters", Security and Privacy in Communications Networks and the Workshops, 2007, Secure COMM 2007. Third International Conference on, IEEE, Piscataway, NJ, USA Sep. 17, 2007, pp. 320-329.
The International Search Report and the Written Opinion, PCT/US2015/041747, filed Jul. 23, 2015, mailed Oct. 23, 2015, all pages.

* cited by examiner

APPARATUS AND METHOD FOR SHARING A HARDWARE SECURITY MODULE INTERFACE IN A COLLABORATIVE NETWORK

BACKGROUND OF THE INVENTION

A collaborative network is a network with sufficient security mechanism such that each device connected to the collaborative network may be trusted by each of the other devices connected to the collaborative network. The level of security required to obtain such trust may vary from deployment to deployment. To participate in the collaborative network, a communication device may maintain a security association of sufficient strength with at least one other communication device in the collaborative network. The strength of the security association can be considered sufficient when each of these devices conforms to a predefined security policy. For example, the security policy may specify devices can only collaborate with each other if they are under the control of a single user. Another example, a device may join a collaborative network if the network security implemented by the device uses FIPS specified cryptographic algorithms. Communication devices in the collaborative network may share resources with each other due to the trust provided by the security associations between the devices participating in the collaborative network, and communication devices in the collaborative network may treat each other like separate processors on a multiprocessor system. Typically all the communication devices in a collaborative network are under the control of a single user. Accordingly, the communication devices associated with a single user may be organized into a collaborative and secured local or personal area network (PAN) around the single user.

The collaborative network may be established by using a pairing protocol. Example of these protocols may include but are not limited to protocols over wireless communication links (e.g. Near Field Communication (NFC), Bluetooth, WiFi, LTE, etc.), but also to wired communication link (e.g. LAN, WAN, etc.) During a pairing process, when the separation between the communication devices being paired is within a predefined distance, the communication devices may establish a security association, for example, by exchanging authentication keys or other credentials via a near field communication (NFC) interface. It is well known that a credential may include a digital certificate, an identity assertion, or a PIN, password, or other shared secret. The term "authentication key" as used herein, is considered to include any data, key or credential that is used to establish a security association between two or more nodes. It is well known that in addition to authentication keys, other types of keys are used to protect data from modification or eavesdropping. These are some times known as encryption key. As used herein, the term key (when unqualified by the word "authentication") refers to both authentication keys as well as encryption keys. The authentication key exchanges may be through in-band or out-of-band channels, meaning that the key or credential exchange may occur on the same link that will be used for the collaborative network or on a different link. Subsequent to exchanging the authentication keys, the communication devices may also become paired according to a pairing standard such as Bluetooth. In addition to being paired according to a pairing standard, the communication devices may also perform certificate based authentication, wherein the communications devices may exchange digital certificates. The certificates may include attributes indicating specific domain, policy and/or role associated with the devices.

Each communication device in the collaborative network may include a set of security features. Non-limiting examples of these features may include the following list; access to a Hardware Security Module (HSM), ability to perform cryptographic operations (e.g. encryption, decryption, producing digital signature, verifying digital signature) using a specialized set of cryptographic algorithms (e.g. Suite B algorithms), access to a secured time source, ability to provide secured and tamper proofed data protection and storage). When these communication devices are equipped with an HSM and capable of performing one or more of the additional listed security features these devices are referred to herein as high assurance devices. The specialized set of encryption/cryptographic algorithms, data protection, and storage features included in high assurance devices are referred to herein as being at or above a predefined threshold. When a device performs certain network transactions, such as authentication, using the HSM or the specialized set of cryptographic functions described above, the transaction is said to be occurring at a high assurance level. For example, when a device uses the HSM or the specialized cryptographic functions to perform authentication, the device is said to be performing high assurance authentication. On the other hand, communication devices in the collaborative network that do not support the specialized set of encryption/cryptographic algorithms, data protection, and storage features that are present in a high-assurance device are referred to herein as low assurance devices. A non-limiting example of a high assurance device may include a portable radio that interfaces with a hardware security module (HSM). The HSM is a physical, tamper resistant, computing device that is configured to safeguard and manage digital keys for authentication and provide cryptographic processing such as encryption, decryption, digital signing, and digital signature verification. A communications device may have an HSM that permanently built into the communications device, such as is the case when an HSM chip that is soldered onto the communications device mother board, or when the HSM is built into the communications device microprocessor. The HSM may also be external to the communications device, for example, when the communications devices is able to access the HSM via a secured network, or when the HSM is a plug-in card or an external device that attaches directly to a communication device. Another non-limiting example of a high assurance device may be a communication device with a smart card that can execute Suite B cryptographic algorithms using 384-bit or 512-bit elliptic curve cryptography (ECC) algorithms and Advanced Encryption Standard (AES) AES-256 and that can perform robust authentication. Non-limiting examples of low assurance devices may include personal devices such as a consumer-grade cellphone, smartphone, personal digital assistance, or digital glasses. It is unlikely and uneconomical for a low assurance device to include, for example, its own HSM. Nevertheless, there may be a need to conduct high assurance transactions on applications being executed on the low assurance device.

One goal of a collaborative network is for the communication devices in the network to share resources in order to fulfill requests made by the user. For example, the communication devices in the PAN may share wireless interfaces and storage. It may also be desirable to have the communication devices share security features. For example, it may be desirable to have a low assurance device in a collaborative network access an HSM associated with a high assurance device in the collaborative network. In so doing, the user may be enabled to access an application or services requiring high assurance authentication, via the high assurance device associated with the HSM, and the user may use credentials stored on the HSM when accessing the application or services from the low assurance device. In another example, it may also be desirable to have a low assurance device in the collaborative network stores its login credentials on the HSM of a high assurance device.

Accordingly, there is a need for an apparatus and method for sharing a security module in a collaborative network. The term security module may refer to a hardware security module (HSM) or to software security module, preforming the same or similar functions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
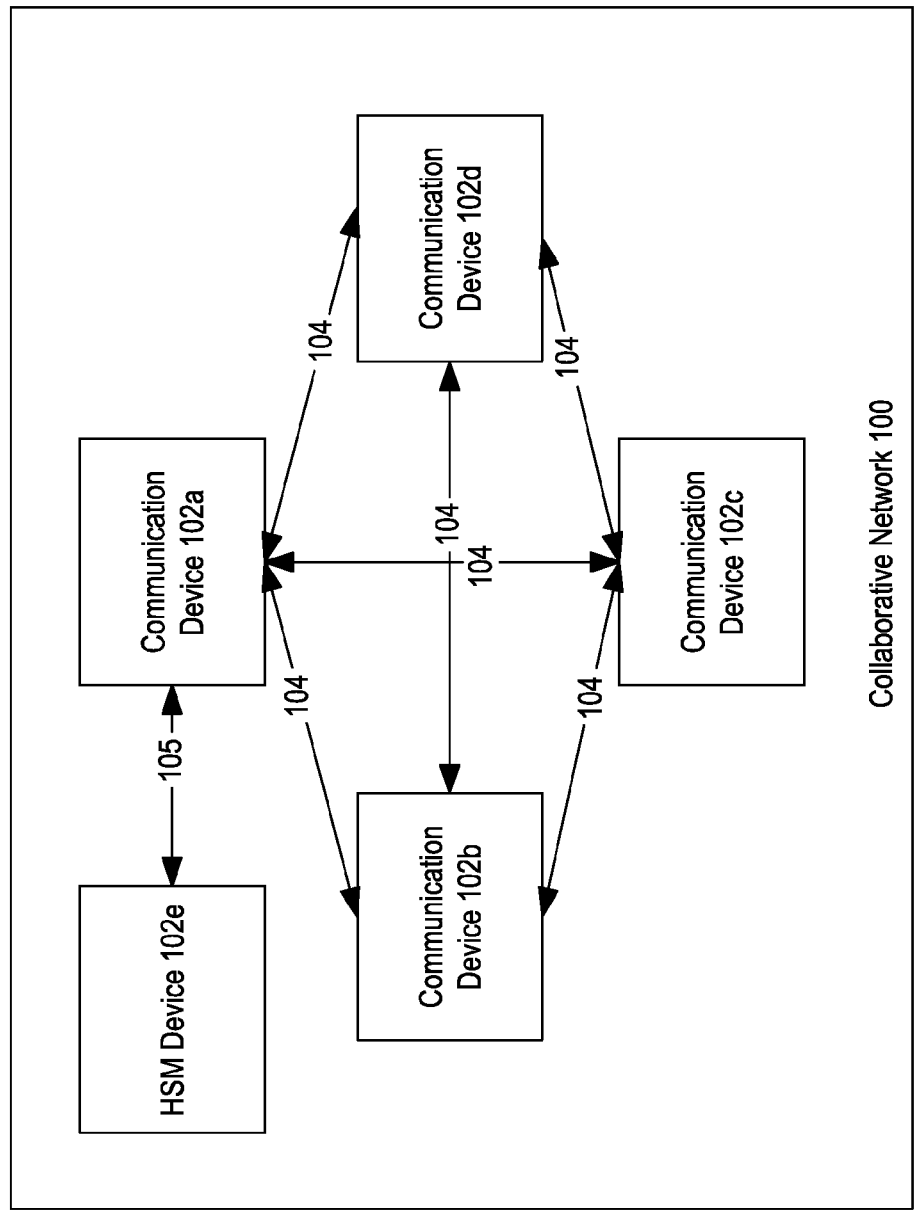
FIG. 1 is a block diagram of a network formed in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatus for sharing a security module between communication devices. A first communication device having a secure access to the security module establishes a collaborative network by forming a collaborative security association with a second communication device associated with a user of the first communication device. The first communication device (a) sends an advertisement of services associated with the security module to the second communication device and receives an advertisement response from the second communication device or (b) receives a solicitation request for services associated with the security module from the second communication device. Responsive to receiving one of the advertisement response and the solicitation request, the first communication device determines whether the second communication device is authorized to access the security module. The first communication device processes and forwards security service messages between the second communication device and the security module, in response to determining that the second communication device is authorized to access the security module.

FIG. 1 is a block diagram of a collaborative network formed in accordance with some embodiments. Collaborative network 100 may be a secured local or personal area network that includes two or more communication devices 102 (i.e., communication device 102a-102d) associated with a single user. Communication devices 102 may be, for example, high assurance devices such as radios or equivalent communication devices with a set of security features above a predefined threshold or low assurance devices such as cell phones or equivalent communication devices with a set of security features below the predefined threshold. Collaborative network 100 may be formed by pairing communication devices 102 using a pairing standard such as Bluetooth or Wi-Fi. Alternately or additionally, communication devices 102 may perform certificate based authentication to pair and establish a security association. The process of pairing two communication devices 102 in network 100 and exchanging authentication keys and/or performing certificate based authentication is referred to herein as establishing a collaborative security association between the paired communication devices 102. Each communication device 102 may establish a security association with one or more other communication devices, causing the topology of network 100 to be dynamic. Lines 104 show security associations between communication devices 102. Non-limiting examples of the network topologies that may be formed by pairing communication devices 102 may include an ad-hoc network topology, a meshed network topology or a star network topology.

Each communication device 102 may include a set of security features wherein the security features included in, for example, communication device 102a, may or may not be included in, for example, communication devices 102b-102d. Consider, for example, that communication device 102a has a collaborative security association with, for example, a hardware security module (HSM) device 102e and that communication device 102a also has collaborative security associations (as shown by lines 104) with each of communication devices 102b-102d. The association between communication device 102a and HSM device 102e may be via a collaborative security association (as shown by line 105) between the devices or communication device 102a may have direct access to HSM device 102e. For example, HSM device 102e may be included in communication device 102a and HSM device 102e and communication device 102a may be connected via an internal communication bus. In another example, HSM device 102e and communication device 102a may be connected via a separate internet protocol (IP) network that does not include communication devices 102b-102d. Therefore, although communication devices 102 form a collaborative network, communication device 102a may have exclusive connectivity to HSM device 102e. It should be noted that although FIG. 1 shows a connection between a communication device and an HSM device, the discussion herein may be applicable to a connection between any security module and a communication device in a collaborative network.

In an embodiment, the device (in this case, communication device 102a) with access to the HSM service offered by HSM device 102e may advertise the HSM service to other communication devices (i.e., communication devices 102b-102d) in collaborative network 100. Only communication devices (i.e., communication devices 102b-102d) connected to collaborative network 100 may receive the advertisements sent by communication device 102a. In another embodiment, one or more of communication devices 102b-102d seeking the HSM service (referred to herein as a requestor communication device) may solicit information about existing HSM services offered on network 100, without necessarily waiting for an advertisement from the communication device with access to the HSM service.

The service advertisement sent by communication device 102a may provide, for example, the information about the capabilities of HSM device 102e, access restrictions associated with accessing HSM device 102e, a list of the types of credential which may be used by requestor communication devices 102b-102d, the list of access restrictions associated with each of those credentials. Non-limiting examples of the advertised capabilities of HSM device 102e may include cryptographic algorithms and domain parameters available on the HSM device 102e, message digest algorithms available on HSM device 102e, cryptographic operations carried out by HSM device 102e, types of cryptographic application programming interfaces (APIs) available for accessing the service on HSM device 102e, levels of the Federal Information Processing Standards (FIPS) used on HSM device 102e, hardware acceleration for specific algorithms and operations, modes of connection between the HSM device and a requestor communication device, and a list of credentials which can be shared and the list of applications which are authorized to use each of those credentials.

In one embodiment the services advertised in a service advertisement, or requested in a solicitation requested may be indicated by specifying a trust anchor certificate authority. For example, a solicitation request may include an identity of a trust anchor (TA); for which the requestor is attempting to validate a certificate subordinate to the specified TA, or when the requestors is attempting to be validated by another entity that inherently trusts the specified TA. A trust anchor (TA) is a well-known concept where the TA is a special CA, which is inherently trusted by any node that has been preconfigured to use the special CA as a TA. Also certificates issued by other CAs subordinate to a TA may also be trusted by any node which uses the special CA as a TA. A node may support many TAs. The service advertisement may also include the identity of one or more TAs trusted by the advertiser. In one embodiment the inclusion of the identity of a TA in a service advertisement means that the advertiser is able to validate any certificates issued by the TA or CAs subordinate to the TA. In one embodiment the inclusion of a TA in a service advertisement means the advertiser has a certificate with itself identified as the certificate subject which was issued by the TA or a CA subordinate to the TA.

Non-limiting examples of the cryptographic algorithms and domain parameters that may be used on HSM device 102e may include an advance encryption standard (AES) AES-256, domain parameters of an Elliptic Curve Cryptography domain parameters, an encryption and authentication algorithm such as RSA-2048, and an elliptic curve digital signature algorithm (ECDSA). Non-limiting examples of message digest algorithms that may be used on HSM device 102e may include a set of cryptographic hash functions such as MD5, SHA-1 and SHA-2. Non-limiting examples of cryptographic operations that may be carried out on HSM device 102e may be encryption, decryption, signing, signature verification, message digest, key generation, key derivation function, and random number generation. Non-limiting examples of a type of cryptographic APIs that may be used on HSM device 102e may include PKCS11, MS-CAPI (Microsoft Cryptographic API), or vendor specific APIs. PKCS11 APIs are platform-independent APIs that provide an abstraction layer for use with cryptographic tokens, such as a hardware security module or a smart card. Examples of PKCS11 APIs include C_GenerateKeyPair, C_SignInit, C_SignFinal, C_DecryptFinal, C_EncryptFinal, among others. Examples of levels of FIPS-140 may include level 2 and level 3. Examples of the modes of connection that may exist between HSM 102e and a requestor communication device may include a tunnel or a proxy mode of connection—both connection modes are described in detail below.

The access restrictions advertised by device 102a may specify requirements and constraints for acquiring the HSM service from HSM device 102e. These restrictions may be constraints and requirements set forth by the HSM device 102e, device 102a, or both of the HSM Device 102e and device 102a. The requirements and constraints may be based on one or more criteria. For example, the requirements and constraints may be based on one or more of a device type (for example, whether or not a portable radio or mobile device terminal is allowed to access the service), device capabilities (e.g. whether or not the requestor communication device is equipped with user interfaces (non-limiting examples of user interface may include physical/virtual keyboard/keypad, display, voice prompts), level of assurance (for example, whether or not the requestor communication device with a low assurance device or a high assurance device is allowed access), one or a combination of field/parameters and/or values in a certificate of the requestor communication device, and/or a certificate chain of a certificate authority (CA) certificate of the requestor communication device. In one example, the requirements and constraints may be based on one or more of a subject/issuer distinguished name (DN), an expiration date (i.e., a date not before and/or not after a set date), a certificate policy (CP) object identifier (OID) extension, and key usage extension. In an example where the requirements and constraints are based on the CP OID, communication device 102a may allow a requestor communication device with a CP OID indicating the requestor communication device is a field commander or that the requestor communication device and communication device 102a are part of the same organization to access to HSM device 102e. Service advertisements may also include the set of trust anchors present on communication device 102a, for instance. So communication devices using the HSM, for example, communication device 102b, may not need to perform a CPU-intensive operation of validating a certificate chain of a relying party that has as its trust anchor one of the trust anchors in HSM device 102e.

One or more of communication devices 102b-102d may request access to HSM device 102e when the communication device 102b is capable of satisfying the requirements advertised by communication device 102a. For example, device 102b may request access to HSM device 102e when communication device 102b is capable of satisfying the requirements advertised by communication device 102a. Accordingly, in response to the advertisement from communication device 102a, communication device 102b may transmit an advertisement response to communication device 102a. In an embodiment, prior to receiving the advertisement, communication device 102b may transmit a service solicitation request to communication device 102a. The service solicitation request and/or the advertisement response (both of which are referred to herein as a service solicitation) may include, for example, one or more of a credentials that communication device 102b intends to use for authenticating itself to HSM device 102e, to communication device 102a, or to both HSM device 102e and device 102a, a preferred mode of connection for connecting communication device 102b to HSM device 102e, and an application identifier for indicating which application in communication device 102b will use the HSM service. Non-limiting examples of credentials may include digital certificate, public key, username/password, SAML ID assertions, hostname, FQDN, or any combination of those. Non-limiting example of application identifiers may include application name, application OID, version, fingerprint, digital signature. The service solicitation may also include one or more of HSM capabilities required by communication device 102b, HSM capabilities that are optional for communication device 102b, the type of device requiring the HSM service (i.e., the device type of communication device 102b), the level of assurance of communication device 102b, the authorization privileges of communication device 102b, and a list of credentials which are required by communication device 102b and/or a list of authorized applications associated with each of those credentials. The authorization level of device 102b may indicate that device 102b is authorized to access top secret, secret, confidential, restricted, or classified contents. The list of device 102b credential may include device certificate issued by government, private agencies, or the device manufacturer. It may also include a device public key. The list of applications at device 102b which require the HSM service may include voice encoder/decoder, IPSec client/server, TLS client/server. A device type of communication device 102b may include but not limited to Bluetooth headset, mobile data terminal, portable radio with no display, smartphone. Depending on the policy of device HSM 102e and/or device 102a, the advertisement message from device 102a may state that the source of activation data for HSM device 102e should be from the communication device using HSM device 102e. For example, if device 102b is requesting a high assurance key from HSM device 102e, the user may be prompted on communication device 102b to enter the activation data (for example, a PIN). If communication device 102b does not have user interface mechanism (e.g. keyboard or display), the user may be prompted to enter the activation data on communication device 102a instead. This provides additional confirmation that communication device 102b is part of the collaborative network associated with the particular user.

If communication device 102a can fulfill the requirements specified by communication device 102b in the service solicitation, communication device 102a may transmit a solicitation response responsive to the service solicitation. The solicitation response may include a list of credentials which can be used by communication device 102b and, more particularly, an application on communication device 102b authorized to access the HSM device 102e.

To share the HSM service among communication devices 102, based on the service solicitation, communication device 102a may establish an HSM session with HSM device 102e. For example, if subsequent to receiving the service solicitation communication device 102a does not have an existing HSM session with HSM device 102e, communication device 102a may initiate a new HSM session with HSM device 102e. Device 102a uses information included in the service solicitation to determine if a request from device 102b can be associated with an existing HSM session between device 102a and the HSM device 102e. For example communications device 102a may be providing HSM based services to communications device 102c, when it receives a solicitation request from communications device 102b. Based on preconfigured policy at device 102a or the HSM, communications device 102a may determine that a new HSM session is required, or that new activation data is required to allow device 102c to have access to the HSM device 102e. When communication device 102a is establishing an HSM session with HSM device 102e, communication device 102a may verify that the credentials used by communication device 102b in establishing the collaborative security association are appropriate for accessing HSM device 102e. Communication device 102a may obtain the credentials for communication device 102b from another device, for example, communication device 102d. Communication device 102a may also use a cache credentials for device 102b.

Alternatively or in addition to verifying the credentials for communication device 102b, HSM device 102e may request that communication device 102a provide information to authenticate that communication device 102a has access to activation data (for example, a PIN) associated with the required credentials in the HSM device 102e. In responding to HSM device 102e's activation data inquiry, communication device 102a may use its cached activation data. The cached activation data may be stored locally at device 102a or at remote location. Alternatively, if communication device 102a cannot obtain valid activation data from its cache storage, communication device 102a may prompt the user for the activation data. When communication device 102a obtains the activation data from the user, communication device 102a can store the activation data in its cache storage. Communication device 102a may use HSM device 102e activation data policy to cache or discard the activation data. The caching policy may also have constraints governing a caching validity period and/or the period the HSM service may remain available before new activation data is required. In one embodiment, device 102a uses a table lookup to determine if a key has already been activated (thus it is associated with an HSM session), or the activation data associated with a key identifier is still valid. In one embodiment, the table may include a list of key identifiers, its corresponding HSM session identifiers, and the caching validity period for each of the session and/or key identifiers. Non-limiting examples of key identifier may include a unique key name/label, hash of the key), expiration date. Non-limiting example of an HSM session identifier may include a unique session name/label, expiration period, HSM hostname/FQDN, IP address, MAC address, PCI bus address, serial number, or combination of those.

In one embodiment, communication device 102a may verify whether or not a key requested by communication device 102b has been activated. In this disclosure the term 'activating a key' means that the key is available for use in crypto operations. The typical way to activate a key is for the user to provide a PIN, a password, or a pass phrase. If the key has been activated, communication device 102a knows there is an existing HSM session for that key. In this scenario, communication device 102a performs the crypto operation requested by device 102b using the existing session.

If subsequent to receiving the service solicitation communication device 102a has an existing HSM session with HSM device 102e, communication device 102a may verify whether the existing HSM session attributes are suitable for fulfilling the request from communication device 102b. The HSM session attributes may specify the mode of connection (i.e., tunnel or proxy) between communication device 102b and HSM device 102e, and, for the tunnel connection mode, the user of the connection (identified by the credential of communication device 102b). If the existing HSM session attributes are unsuitable for proxy mode, communication device 102a may modify the existing HSM session attributes to fulfill the request from communication device 102b. If the existing HSM session attributes are suitable to fulfill the request from communication device 102b, communication device 102a use the existing HSM session attributes. Note that in tunnel mode, a new HSM session is established (as discussed in more detail below) because the new HSM session is between HSM device 102e and the communication device using the HSM (for example, communication device 102b). When verifying the requested HSM session attributes against an existing HSM session attributes, device 102a may use an HSM session attribute matching policy. The policy may specify that a request can be fulfilled by an existing HSM session attributes if the value of the requested attributes matches with and/or within the range of a value specified in the policy. Non-limiting example of HSM session attributes include type of connection (i.e. tunnel or proxy mode), identifiers of user of the HSM session. Non-limiting examples of identifiers of user of the session include device or application Distinguished Name, name, OID, serial number, device certificate, device IP address, MAC address, device hostname/FQDN.

In the proxy connection mode, communication device 102a may facilitate the connection between a requestor communication device, such as communication device 102b, and HSM device 102e. Thus, in the proxy connection mode, communication device 102b may not have an end-to-end HSM session with the HSM device 102e. Instead, an independent HSM proxy session may exist between communication device 102b and communication device 102a and an independent HSM session or direct connection may exist between communication device 102a and HSM device 102e. The HSM proxy session between communication device 102b and communication device 102a may be secured via a collaborative security association and the HSM session between communication device 102a and HSM device 102e may be via a local interface or via a networked security association. Non-limiting examples of protocols for forming a security association include TLS/SSL, IPSec, other security protocols that provide any or a combination of data integrity, authenticitication, and message privacy).

In the proxy connection mode, communication device 102a forwards messages from communication device 102b to the HSM device 102e. In the proxy connection mode, communication device 102a enforces access control for keys to be used by the requestor communication device (in this case, communication device 102b). In an embodiment, communication device 102a may use an access control table to control access to a key identifier requested by communication device 102b or, more specifically, an application hosted in communication device 102b. The table may include rules for allowing one or more communication devices to access specific keys, specifying which applications can access which keys, specifying which applications can perform which crypto operations, specifying if keys can be shared with different devices, for how many devices, and which devices. In this connection mode, communication device 102a encapsulates the information from communication device 102b, and all cryptographic operations initiated by and for communication device 102b are proxied by communication device 102a (i.e., the cryptographic operations are sent to and from HSM device 102e via communication device 102a). In this connection mode, device 102a may hide details of APIs used in the HSM session. Instead, device 102a may provide device 102b with a simplified APIs for accessing the HSM service at HSM device 102e. In this embodiment, device 102a may translate the API calls understood by device 102b into the API calls understood by the HSM device 102e. Device 102a may also translate the API calls understood by device HSM device 102e into the API calls understood by device 102b.

Messages of cryptographic operations between communication device 102b and HSM device 102e may be deciphered by communication device 102a. Having communication device 102a decipher cryptographic operation messages between communication device 102b and HSM device 102e may not be a concern because all of the collaborative communication devices 102 in network 100 are associated with the same user. Therefore, in the proxy connection mode, the keys provided to HSM device 102e by communication device 102a may appear to HSM device 102e to belong to communication device 102a. Activation data for the keys in HSM device 102e may be known to communication device 102a and may not be known to the requestor communication device (that is, communication device 102b).

In the tunnel connection mode, a requestor communication device, such as communication device 102b, establishes an independent HSM session with HSM device 102e. In other words, the HSM session between communication device 102b and HSM device 102e is independent of the HSM session between communication device 102a and HSM device 102e. The HSM session between device 102a and HSM device 102e is known as HSM session and the HSM session between device 102b and HSM device 102e is known as HSM tunnel session. As noted previously, in the service solicitation, the requestor communication device, that is, communication device 102b, may indicate the mode of connection. If the tunnel mode is requested by the requestor communication device and communication device 102a cannot support the requested tunnel mode, the requestor communication device may choose to not use the HSM service provided via communication device 102a. Consider, for example, that in addition to communication device 102a, a second communication device (not shown) also has access to HSM services provided either by HSM device 102e or by a second HSM device (not shown). If in response to the service solicitation from communication device 102b, communication device 102a indicates that it does not support the requested tunnel mode and the second communication device indicates that it supports the requested tunnel connection mode, communication device 102b may choose to access the HSM service via the second communication device.

If communication device 102a supports the tunnel connection mode, communication device 102a may introduce communication device 102b to HSM device 102e in order for a separate HSM tunnel session to be established between HSM device 102e and communication device 102b. In one embodiment, device 102a introduces device 102b to HSM device 102e by identifying device 102b as the endpoint of the HSM tunnel session for a tunnel connection to an HSM device 102e. In the request, device 102a may include device 102b identity, credentials, the collaboration security association attributes of device 102a and device 102b, and device 102b capability. Non-limiting examples of collaboration security association attributes include level of assurance, validity or refresh period, and security protocols for establishing the collaboration security association. Non-limiting examples of device 102b capabilities include an input unit (e.g., keypad, pointing device, etc.), an output transducer unit (e.g., speaker), an input transducer unit (e.g., a microphone) (MIC), and a display screen. Non-limiting examples of device identity include Distinguished Name, name, network address, FQDN, hostname, device serial number, device's key identifier. In one embodiment, device 102b and HSM device 102e may be able to establish a HSM tunnel session directly. In another embodiment, device 102a may assist device 102b and HSM device 102e to establish a HSM tunnel session. In assisting device 102b and HSM device 102e to establish a HSM tunnel session, device 102a may provide device 102b and HSM device 102e with a one-time pre-shared key or a short-lived security token which can be used by device 102a and HSM device 102e to establish a HSM tunnel session. Non-limiting example of security tokens may include a SAML, OAuth, or openID token, Accordingly, in the tunnel connection mode, communication device 102b may have an end-to-end HSM tunnel session with HSM device 102e that does not include communication device 102a as an intermediary, that is, while communication device 102a may be in a path between communication devices 102b and HSM device 102e, communication device 102a does not serve as an endpoint of an HSM tunnel with either device. The HSM tunnel session between HSM device 102e and communication device 102b may be secured via, for example, transport layer security/secure sockets layer (TLS/SSL), Internet Protocol security (IPSec), or another application layer security association.

In the tunnel connection mode, communication device 102a may forward/route cryptographic API calls from communication device 102b to HSM device 102e. The cryptographic API traffic between communication device 102b and HSM device 102e may be private after the tunnel is setup between HSM device 102e and communication device 102b. In this case, communication device 102a may be unable to decipher cryptographic API traffic between communication device 102b and HSM device 102e. HSM device 102e may enforce access control for keys to be used by collaborative devices. From the point of view of HSM device 102e, keys in the HSM device 102e may belong to either communication device 102a or communication device 102b. When communication device 102b creates a new key, communication device 102b may specify the access control for that key. The activation data for the key may be generated by communication device 102b or it may be inputted by the user into communication device 102b. In both cases, the activation data may be used to activate the key at HSM device 102e and the activation data for that key may be known to only communication device 102b. At the same time, HSM device 102e may provide device 102a with a deactivation data. The deactivation data may be used to deactivate the key for communication device 102b and close the session associated with that key. For example, when the collaboration link between communication device 102a and communication device 102b is terminated, communication device 102a may use a deactivation data authorized by HSM device 102e to deactivate the key associated with communication device 102b. At a subsequent period, when communication device 102b and communication device 102a reestablish the HSM tunnel session, if previously created keys are still valid, communication device 102b may use the activation data to reactivate the key. Non-limiting example of activation and deactivation data may include but not limited to PIN, password, pass-phrase, SAML, OAuth, or OpenID tokens.

In tunnel and proxy modes, communication device 102b may use HSM device 102e for its own purposes. For instance, communication device 102b may store the private key of the certificate it uses to authenticate itself to a relying party in HSM device 102e. Communication device 102b may then use HSM device 102e to sign messages to the relying party in order to authenticate itself. The signing operation can be done in HSM device 102e. Another example may involve communication device 102b using its private key stored in HSM device 102e to decrypt a message it received from a relying party.

In one embodiment, upon communication device 102b successfully authenticating itself to HSM device 102e, communication device 102b may include an indication of the presence of HSM device 102e in its own service advertisement in the collaborative network. This would be useful in a collaborative network that has a multi-hop topology.

In both the proxy and tunnel modes, when device 102b no longer needs the service provided by HSM device 102e, device 102b may inform device 102a or HSM device 102e that device 102b no longer needs the service of HSM device 102e. When device 102b no longer need the HSM proxy session, device 102a may indicate to the HSM device 102e whether to delete or deactivate keys that are used by device 102b. When device 102b no longer need the HSM tunnel session, device 102b may indicate to HSM device 102e whether to delete or keep keys that are used by device 102b.

Figure 2:
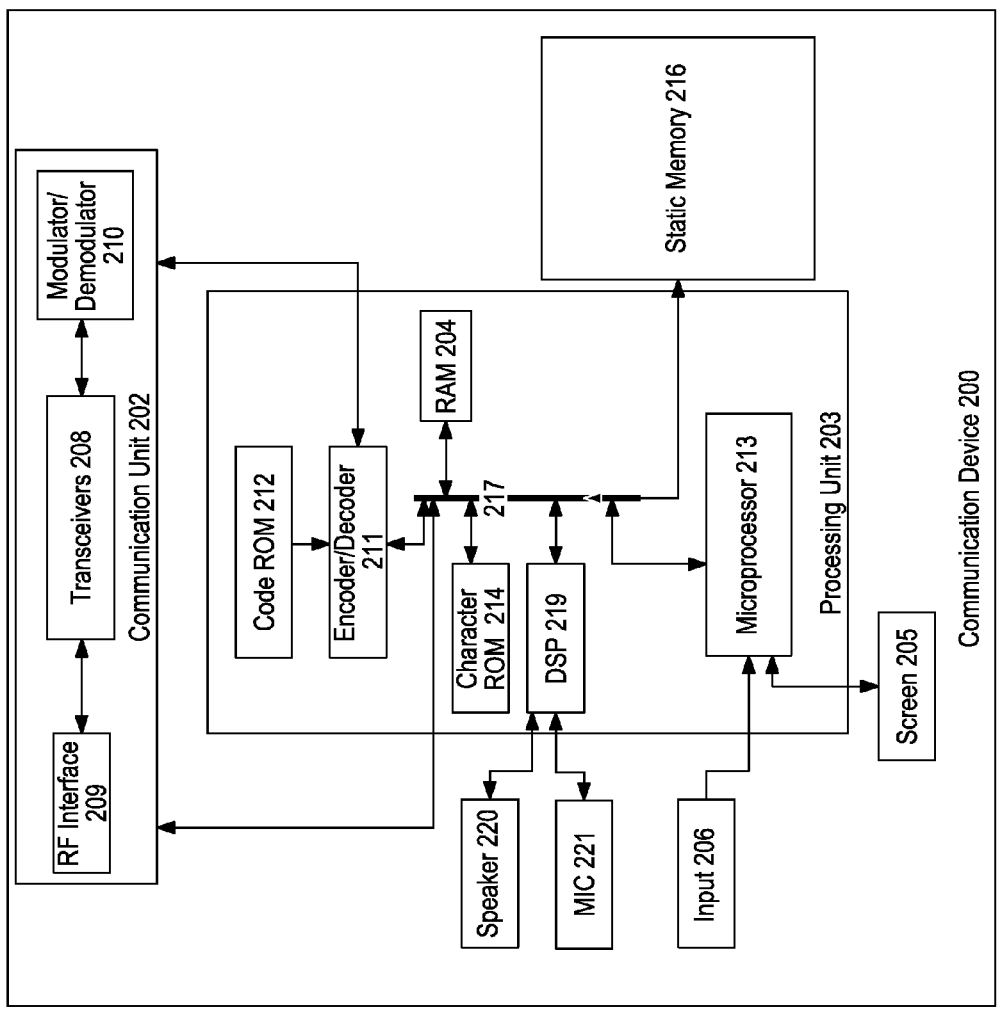
FIG. 2 is a block diagram of a communication device used in accordance with some embodiments.

FIG. 2 is a block diagram of a communication device 200, such as communication devices 102a-102d, used in accordance with some embodiments. Communication device 200, for example, may include a communications unit 202 coupled to a common data and address bus 217 of a processor 203 (also referred to herein as processing unit 203). Communication device 200 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processor 203.

The processor 203 may include, that is, implement, an encoder/decoder 211 with an associated code read-only memory (ROM) 212 for storing data for encoding and decoding voice, data, control, or other signals that may be transmitted or received by communication device 200. The processor 203 may further include one or more of a microprocessor 213 and digital signal processor (DSP) 219 coupled, by the common data and address bus 217, to the encoder/decoder 211 and to one or more memory devices, such as a character ROM 214, a random access memory (RAM) 204, and a static memory 216. One or more of ROM 214, RAM 204 and flash memory 216 may be included as part of processor 203 or may be separate from, and coupled to, the processor 203. The encoder/decoder 211 and the cryptographic engine 230 may be implemented by microprocessor 213 or DSP 219, or may each be implemented by a separate component of the processor 203 and coupled to other components of the processor 203 via bus 217.

Communications unit 202 may include an RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 210 that is coupled to the encoder/decoder 211.

Figure 3:
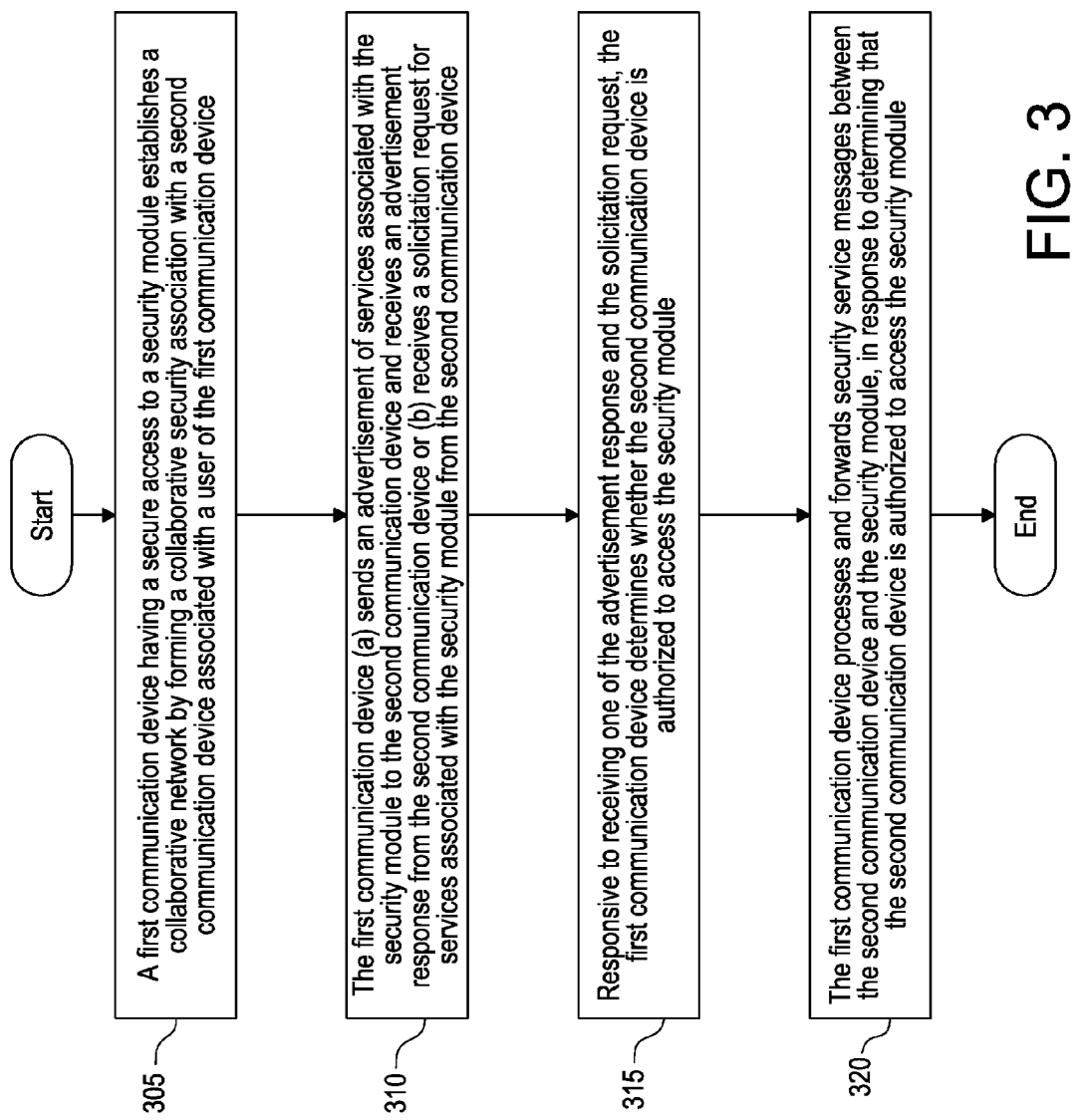
FIG. 3 illustrates a flow diagram of a method of used in accordance with some embodiments.

The one or more memory devices 212, 214, 216 store code for decoding or encoding data such as control, request, or instruction messages, channel change messages, and/or data or voice messages that may be transmitted or received by device 200 and other programs and instructions that, when executed by the processor 203, provide for the device 200 (for example, communication devices 102a-102d) to perform the functions and operations described herein as being performed by such a device, such as the implementation of the encoder/decoder 211 and one or more of the steps set forth in FIG. 3.

FIG. 3 is a flow diagram of a method implemented in accordance with some embodiments. At 305, a first communication device, such as communication device 102a, having a secure access to a security module, such as HSM device 102e, establishes a collaborative network by forming a collaborative security association with a second communication device, such as communication device 102b, associated with a user of the first communication device. At 310, the first communication device (a) sends an advertisement of services associated with the security module to the second communication device and receives an advertisement response from the second communication device or (b) receives a solicitation request for services associated with the security module from the second communication device. At 315, responsive to receiving one of the advertisement response and the solicitation request, the first communication device determines whether the second communication device is authorized to access the security module. At 320, the first communication device processes and forwards security service messages between the second communication device and the security module, in response to determining that the second communication device is authorized to access the security module.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
    establishing a collaborative network, at a first communication device having a secure access to a security module, by forming a collaborative security association between the first communication device and a second communication device, wherein the first communication device and the second communication device are associated with a user;
    at least one of:
        sending, by the first communication device to the second communication device, an advertisement of services associated with the security module and receiving an advertisement response from the second communication device, and receiving, by the first communication device from the second communication device, a solicitation request for services associated with the security module;

responsive to receiving one of the advertisement response and the solicitation request determining, by the first communication device, whether the second communication device is authorized to access the security module;

establishing, by the first communication device, a session with the security module to provide security services offered by the security module to the second communication device according to one of the advertisement response and the solicitation request, wherein the session is established by providing activation data;

using, by the first communication device, activation data policy provided by the security module to one of store and discard the activation data; and forwarding, by the first communication device, security service messages between the second communication device and the security module, responsive to determining that the second communication device is authorized to access the security module.

2. The method of claim 1, where one of the advertisement response and the solicitation request includes data representing a PKCS11 function and associated arguments.

3. The method of claim 1 where the determining further comprises verifying that credentials used by the second communication device in establishing the collaborative security association are appropriate for accessing the security module.

4. The method of claim 3 wherein the determining further comprises obtaining the credentials of the second communication device from a third device in the collaborative network.

5. The method of claim 1 wherein the processing further comprises decrypting and encrypting messages between the second communication device and the security module and enforcing access control.

6. The method of claim 1, wherein the session is established in one of a proxy mode or a tunnel mode, wherein in the proxy mode, communication between the second communication device and the service module is transmitted through the first communication device.

7. The method of claim 6, wherein the session is established in the proxy mode and the first communication device one or more of:
  enforces access control for a key to be used by the second communication device; and
  forwards cryptographic operations requested by the second communication device to the security module.

8. The method of claim 6, wherein the session is established in the tunnel mode and wherein, when in the tunnel mode,
  the first communication device introduces the second communication device to the security module,
  the second communication device establishes an independent session with the security module, and
  the first communication device routes traffic between the second communication device and the security module and is unable to decipher cryptographic information transmitted between the second communication device and the security module.

9. The method of claim 6, wherein the session is established in the tunnel mode and wherein, when in the tunnel mode:
  the security module enforces access control for a key to be used by the second communication device,
  activation data provided by the second communication device for activating the key in the security module is known to the second communication device, and
  one of the first communication device and the second communication is configured to deactivate the key and close the session.

10. The method of claim 1, wherein the advertisement includes at least one of:
  information about the capabilities of the security module,
  access restrictions associated with accessing the security module,
  a list of the types of credential to be used by the second communication devices, and
  an access restrictions associated with each of the credentials.

11. The method of claim 1, wherein the connection between the first communication device and the security module is by one of a first security association between the first communication device and the security module, an internal communication bus on the first communication device, and a network connection outside of the collaborative network.

12. The method of claim 1, further comprising advertising, by the second communication device, services associated with the security module in a service advertisement.

13. A method, comprising:
  establishing a collaborative network, at a first communication device having a secure access to a security module, by forming a collaborative security association between the first communication device and a second communication device, wherein the first communication device and the second communication device are associated with a user;
  at least one of:
    sending, by the first communication device to the second communication device, an advertisement of services associated with the security module and receiving an advertisement response from the second communication device, and
    receiving, by the first communication device from the second communication device, a solicitation request for services associated with the security module;
  responsive to receiving one of the advertisement response and the solicitation request determining, by the first communication device, whether the second communication device is authorized to access the security module;
  establishing, by the first communication device, a session with the security module to provide security services offered by the security module to the second communication device according to one of the advertisement response and the solicitation request, wherein the session is established by providing activation data;
  verifying, by the first communication device, that session attributes for an existing session are suitable for fulfilling one of the advertisement response and the solicitation request and modifying the session attributes if the session attributes are determined to be unsuitable; and
  forwarding, by the first communication device, security service messages between the second communication device and the security module, responsive to determining that the second communication device is authorized to access the security module.

14. The method of claim 13, wherein the session is established in one of a proxy mode or a tunnel mode, wherein in the proxy mode, communication between the second communication device and the service module is transmitted through the first communication device.

15. The method of claim 14, wherein the session is established in the proxy mode and the first communication device one or more of:
   enforces access control for a key to be used by the second communication device; and
   forwards cryptographic operations requested by the second communication device to the security module.

16. The method of claim 14, wherein the session is established in the tunnel mode and wherein, when in the tunnel mode:
   the security module enforces access control for a key to be used by the second communication device,
   activation data provided by the second communication device for activating the key in the security module is known to the second communication device, and
   one of the first communication device and the second communication is configured to deactivate the key and close the session.

17. An apparatus capable of operating in a collaborative network formed between at least two communication devices associated with a user, the apparatus comprising:
   a first communication device comprising:
      one or more memory devices;
      a transceiver; and
      a processor configured to:
         form a connection with a security module;
         form at least one security association with a second communication device in the collaborative network;
         one or more of:
         transmit, via the transceiver, an advertisement of services offered by the security module to the second communication device and receive a response to the advertisement from the second communication device, and
         receive, via the transceiver, a solicitation request for services offered by the security module from the second communication device;
         responsive to receiving one of the advertisement response and the solicitation request, determine whether the second communication device is authorized to access the security module;
         process and forward security service messages between the second communication device and the security module, responsive to determining that the second communication device is authorized to access the security module;
      and wherein the processor further is configured to:
         establish a session with the security module to provide security services offered by the security module to the second communication device according to one of the advertisement response and the solicitation request;
         provide activation data associated with required credentials in the security module when establishing the session; and
         use activation data policy provided by the security module to one of store and discard the activation data.

18. The apparatus of claim 17, wherein the processor is configured to:
   verify that session attributes for an existing session are suitable for fulfilling one of the advertisement response and the solicitation request and modify the session attributes if the session attributes are determined to be unsuitable.

19. The apparatus of claim 17, wherein the session is established in one of a proxy mode or a tunnel mode and wherein, when in the proxy mode, the processor is configured to relay communications between the second communication device and the service module.

20. The apparatus of claim 19, wherein when the session is established in the proxy mode, the processor is configured to at least one of enforce access control for a key to be used by the second communication device and forward cryptographic operations requested by the second communication device to the security module.

21. The apparatus of claim 19, wherein the apparatus further comprises the second communication device and wherein when the session is established in the tunnel mode:
   the processor is configured to introduce the second communication device to the security module;
   the second communication device is configured to establish an independent session with the security module; and
   the processor is configured to route traffic between the second communication device and the security module without deciphering cryptographic information transmitted between the second communication device and the security module.

22. The apparatus of claim 19, wherein the apparatus further comprises the second communication device and the security module and wherein when the session is established in the tunnel mode:
   the security module is configured to enforce access control for a key to be used by the second communication device; and
   the second communication device is configured to provide activation data for activating the key in the security module and one of the first communication device and the second communication device is configured to deactivate the key and close the session.

23. The apparatus of claim 17, wherein processor is configured to establish the connection between the first communication device and the security module by one of a first security association between the first communication device and the security module, an internal communication bus on the first communication device, and a network connection outside of the collaborative network.

* * * * *